United States Patent [19]
Kakida et al.

[11] Patent Number: 5,437,529
[45] Date of Patent: Aug. 1, 1995

[54] CONVEYING SYSTEM

[75] Inventors: Takuya Kakida; Shoiti Okada; Yoshiki Nakamura; Akira Mikami; Akiyoshi Kimura, all of Kurashiki; Yuji Watanabe, Kojima, all of Japan

[73] Assignee: Mitsubishi Jidosha Kogyo Kabushiki Kaisha, Tokyo, Japan

[21] Appl. No.: 66,011

[22] PCT Filed: Sep. 30, 1992

[86] PCT No.: PCT/JP92/01255
§ 371 Date: Jul. 27, 1993
§ 102(e) Date: Jul. 27, 1993

[87] PCT Pub. No.: WO93/07042
PCT Pub. Date: Apr. 15, 1993

[30] Foreign Application Priority Data

| Sep. 30, 1991 | [JP] | Japan | 3-079300 U |
| Sep. 30, 1991 | [JP] | Japan | 3-079304 U |
| Sep. 30, 1991 | [JP] | Japan | 3-079305 U |

[51] Int. Cl.6 .................................. B65H 5/00
[52] U.S. Cl. ...................... 414/225; 198/418.1; 198/468.6; 901/8
[58] Field of Search ............ 414/222, 225, 749, 751; 901/6, 7, 8; 198/366, 418.1, 418.2, 468.6

[56] References Cited

U.S. PATENT DOCUMENTS

| 3,608,698 | 9/1971 | Crall | 198/366 |
| 4,675,969 | 6/1987 | Sciaky et al. | 29/281.4 |
| 5,135,349 | 8/1992 | Lorenza et al. | 414/225 X |
| 5,238,240 | 8/1993 | Prim et al. | 198/366 X |

FOREIGN PATENT DOCUMENTS

| 3536014 | 4/1986 | Germany . |
| 62-25465 | 7/1987 | Japan . |
| 1-51396 | 11/1989 | Japan . |
| 2089296 | 6/1982 | United Kingdom . |

*Primary Examiner*—Donald W. Underwood

[57] ABSTRACT

A conveying system has access to a first supply means (11) for supplying a plurality of types of first automobile body components (10a) having different shapes, a second supply means (13) for supplying a single type of second automobile body component (12), and conveys the automobile body components in a combined manner to a next processing station. With the conveying system, a fourth lift (16) receives first body components (10a) of a first type and second body components (12) of a single type from a first carrier (18) and delivers them via a second fork lift (23) to a transfer area near the next processing station, or receives the second components (12) via the second fork lift (23) and the first components (10c) of a second type via a third lift (40), and delivers them to the transfer area when only the second component arrives via the second fork lift (23).

5 Claims, 18 Drawing Sheets

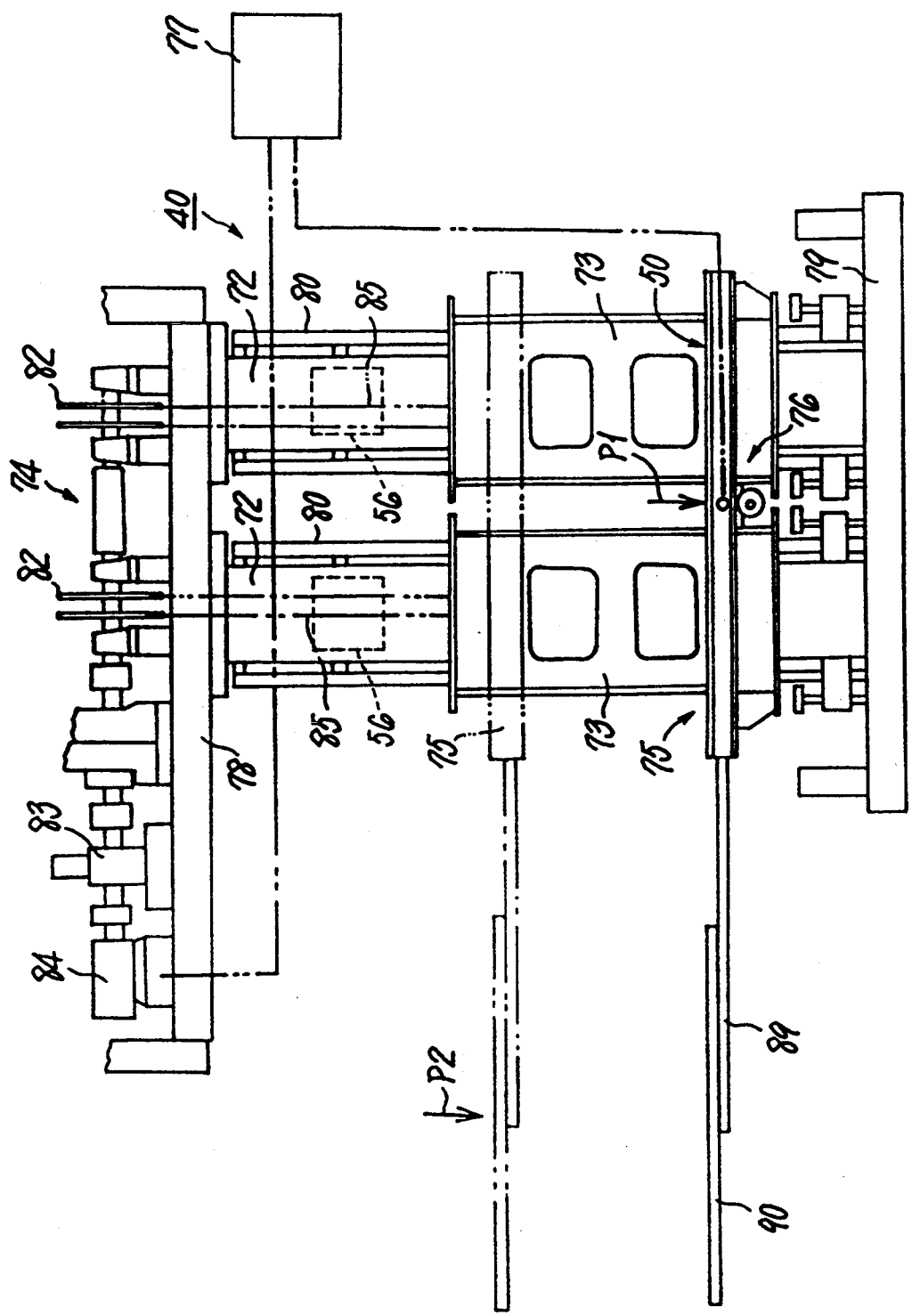

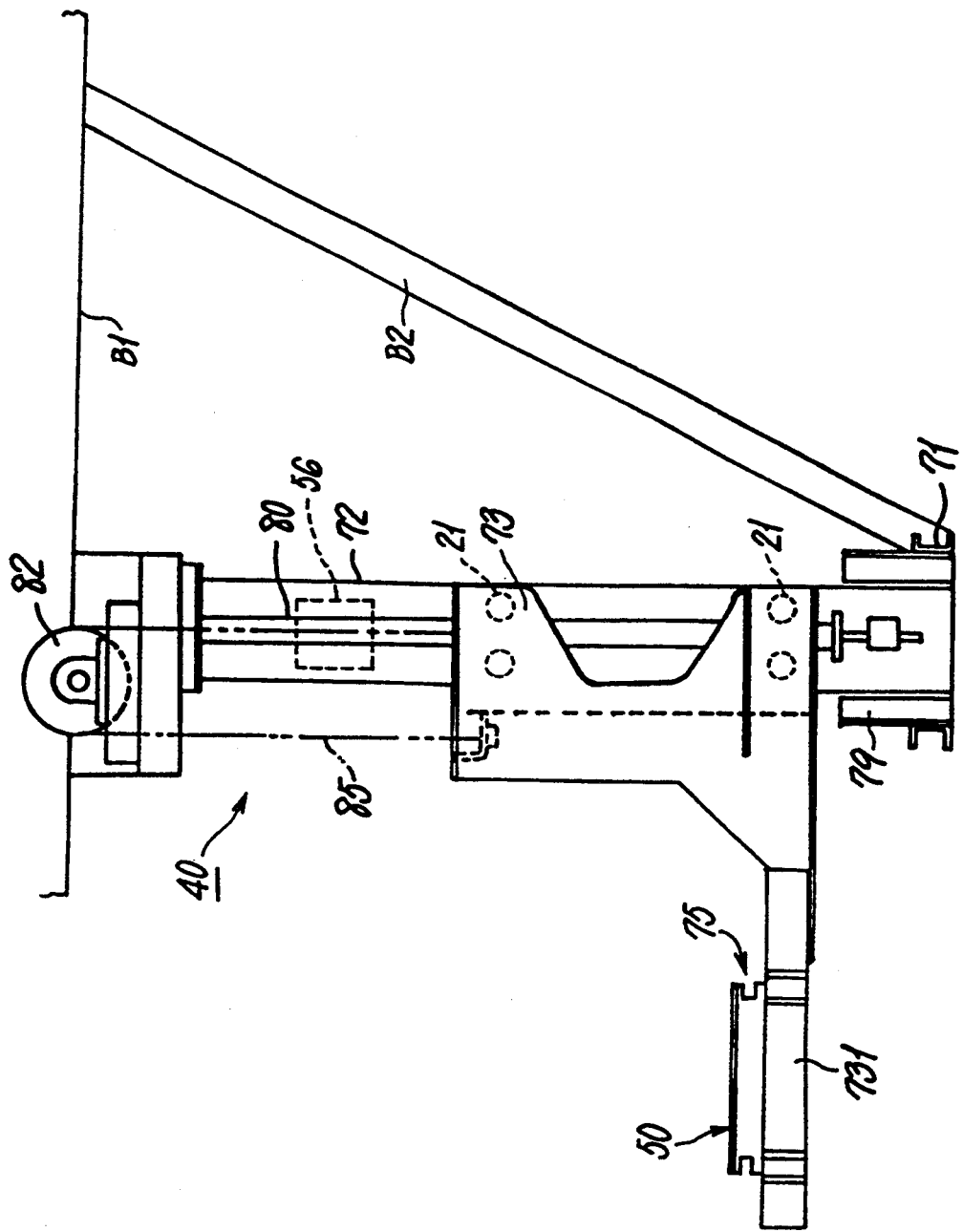

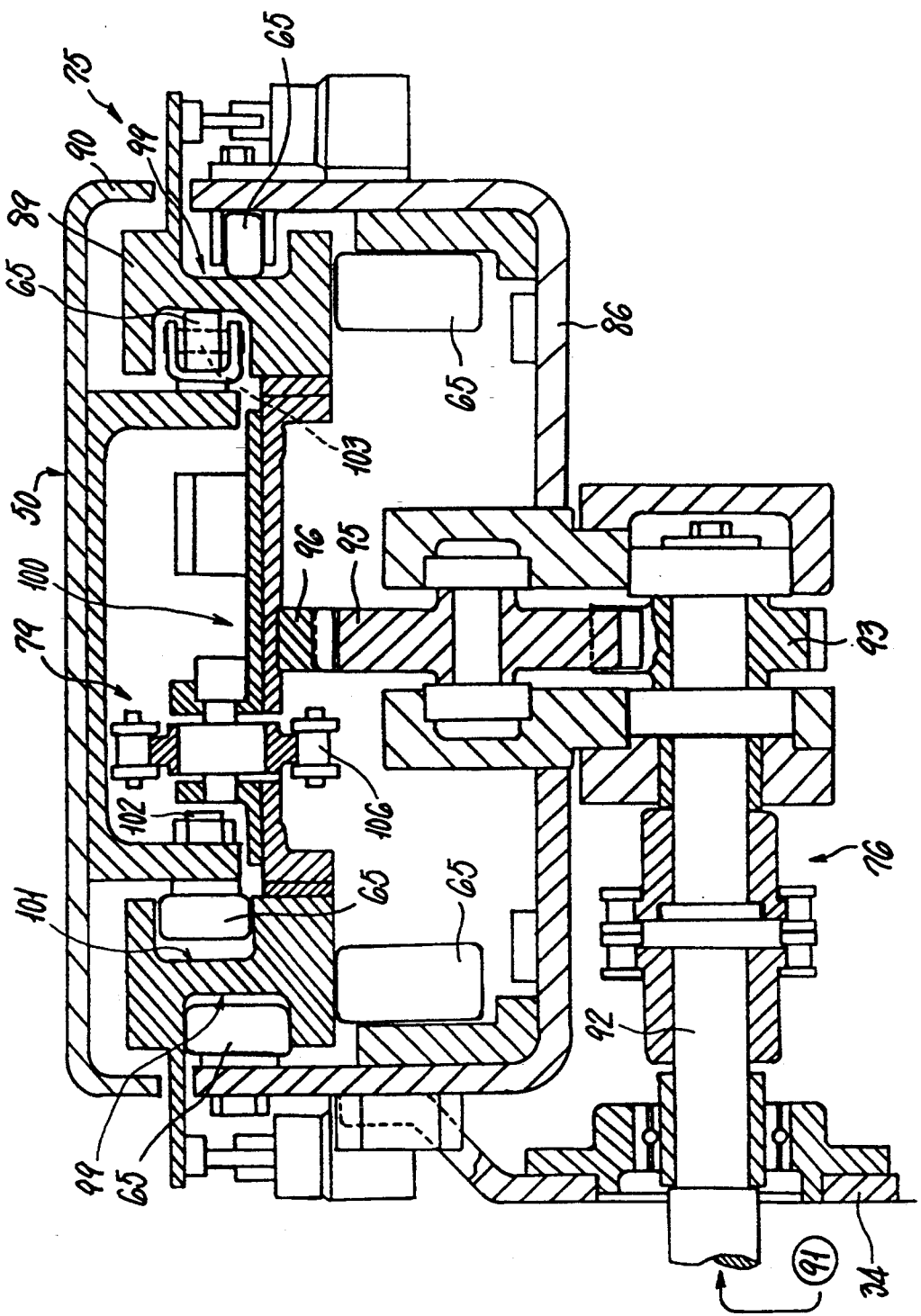

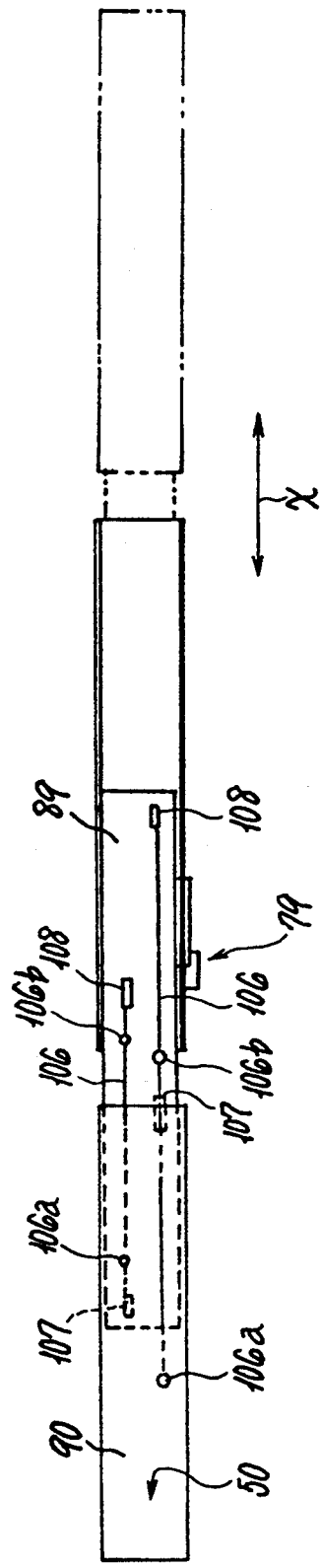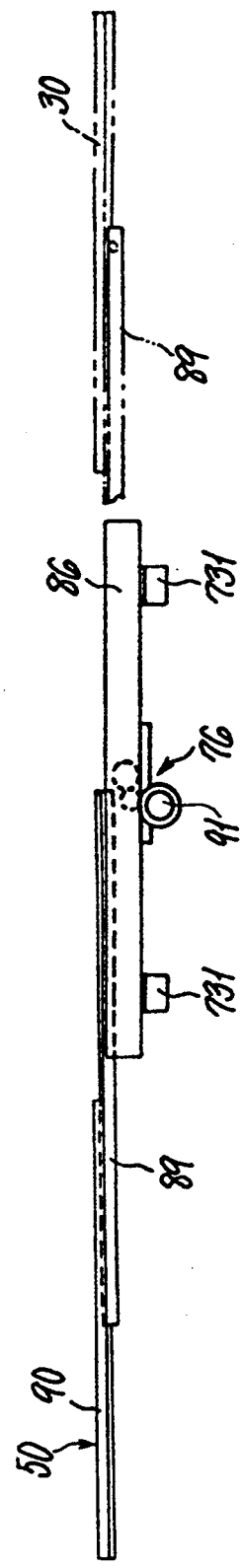
FIG. 12(a)
FIG. 12(b)

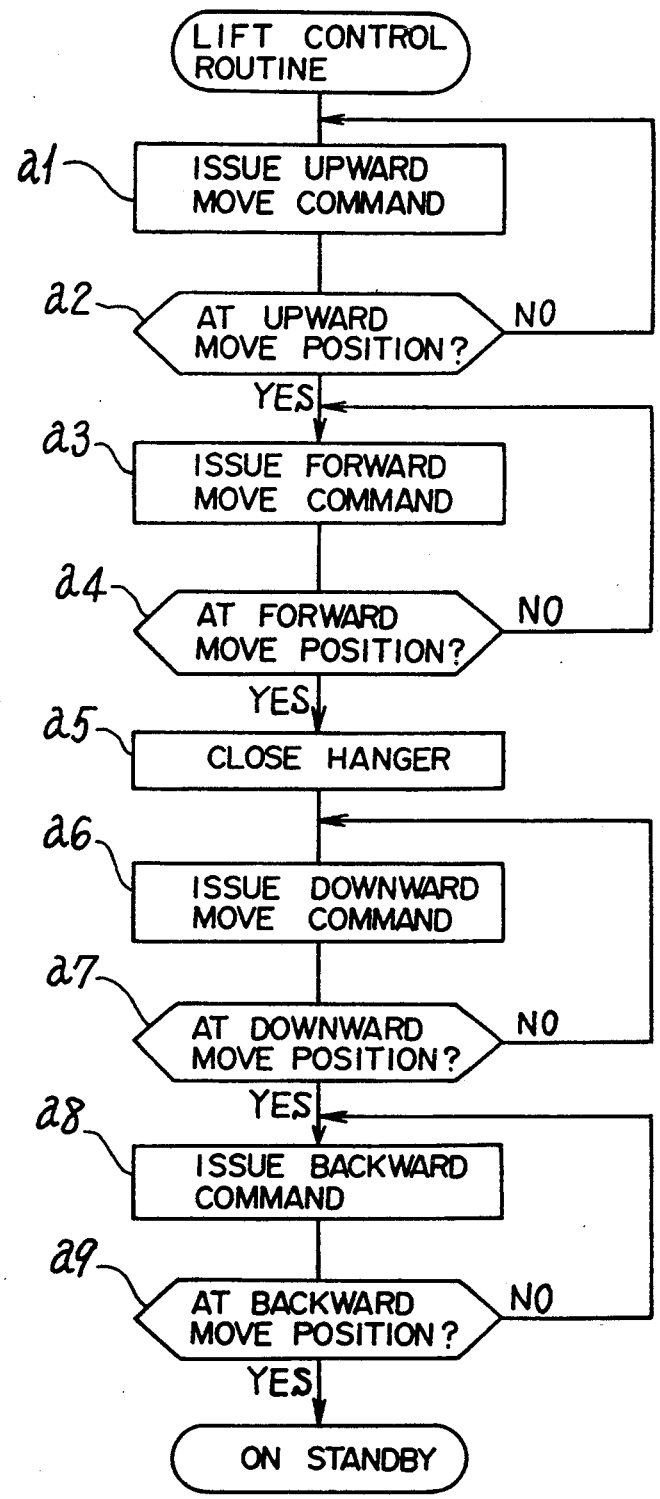

ically as shown by arrow X in FIG. 19(c)). As shown in FIG. 19(c), when the sliding fork member 133 gets to its upper destination, the control unit goes to step a5,
CONVEYING SYSTEM

FIELD OF THE INVENTION

This invention relates to a conveying system for conveying a variety of automobile body components to be assembled in an automobile assembly line.

DESCRIPTION OF THE RELATED ART

Up to now, an assortment of processing machines have been installed in a limited space of an automobile body assembly line. Automobile body components are conveyed to these processing machines at predetermined timing so as to be assembled into an automobile in the preset sequence.

In such an automobile assembly line, a number of conveyers, carriers and hanging conveyers are used to deliver the automobile components at the predetermined timing. The components are also transferred by lifts to other conveying routes which are on different levels.

In an under-body assembly line as shown in FIG. 16 of the accompanying drawings, one type of front floor 121 and two types of rear floors 122 (having different shapes) are loaded on a carrier 123, which is moved toward a transfer area Q1 near a welding section WR. In front of the transfer area Q1, the front and rear floors 121 and 122 are transferred to a lift 126 via a fork lift 125. The lift 126 descends to deliver the floors 121 and 122 to the welding section WR via a conveyer (not shown).

Numerous front floors 121 of the one type are guided to the carrier 123 via a path 127. The rear floors 122 of two types are guided to the carrier 123 via a path 128. Then, the front and rear floors 121 and 122 are loaded on the carrier 123 together, and are delivered to the transfer area Q1, where the floors 121 and 122 are transferred to the lift 126 by the fork lift 125.

As shown in FIGS. 17 and 18, the lift 126 comprises a vertical post 131, a frame 132, and a sliding fork member 133. The frame 132 is slidable on the vertical post 131, and supports the sliding fork member 133. The sliding fork member 133 includes a horizontal plate 134 and a slider 136 for horizontally sliding a table 135 on which the automobile component is placed. The frame 132 is connected to a balancing counterweight 138 via a cable 137. The cable 137 is activated by a lift driver 139 so as to ascend and descend the sliding fork member 133.

The conventional lift 126 usually needs a relatively large balancing counterweight 138. Therefore, the vertical post 131 tends to become long so as to house such a large balancing counterweight.

In operation, the lift 126 is controlled according to the routine as shown in FIG. 20. When an automobile component is placed on the table 135, a control unit (not shown) emits an upward movement command in step a1. In response to this command, the fork member 133 is activated so as to move upwardly in the direction Y as shown in FIG. 19(b). The control unit waits until the sliding fork member 133 reaches its upper destination.

After confirming the arrival of the sliding fork member 133 at its upper destination, the control unit emits an advancing command in step a3, thereby moving the sliding fork member 133 forwardly (i.e. horizontally as shown by arrow X in FIG. 19(c)). As shown in FIG. 19(c), when the sliding fork member 133 gets to its upper destination, the control unit goes to step a5, where it causes a hanger to close and receive the component therein. Then, the control unit advances to step a6, where it emits a downward movement command in response to a hanger closing signal. When the sliding fork member 133 returns to a position for descending motion, the control unit emits a backward movement command. Thus, the slider retracts, returning to its original position as shown in FIG. 19(a). Then, the lift 126 is on standby. As described so far, the conventional lift 126 performs the upward movement, forward movement (horizontal movement), backward movement (horizontal movement), and downward movement in one cycle, which takes rather a long time.

When the front and rear floors 121 and 122 are conveyed by the carrier 123 to the lift 126 and are simultaneouly placed on their set positions of the lift 126 as shown in FIG. 16, the types of components to be carried via the path 127 would inevitably be limited depending upon the capabilities of the path 127 or the carrier 123. This is not preferable when it is desirable to process a variety of automobile components.

Sometimes, it is required to combine a variety of rear floors 122 having different shapes with one type of front floor 121. When such rear and front floors are conveyed by the carrier 123, it is difficult to accurately hold or support them by using fixtures for the assembly work. Sometimes, the front or rear floors extend outwardly from the fork lift 125, interfering with facilities around the conveying path, and preventing their operation.

Furthermore, the vertical post of the lift 126 tends to become longer, whereas the distance in which the frame 2 moves vertically tends to be limited.

When the length of the vertical post 131 is limited due to the layout of the installation space, the moving distance of the frame 132 is also restricted, which means that the sliding fork member cannot move as desired.

If the sliding fork member 133 is designed to be horizontally slidable to a large extent, a relatively large bending moment M would be applied to the frame 132 as shown in FIG. 18. This means that the frame 132 should be sufficiently rigid, which makes it heavy, and of course the weight of the counterweight must also be increased correspondingly.

As described with reference to FIGS. 19(a) to 19(c), the sliding fork member 133 takes a relatively long time to perform its one movement cycle. Specifically, when the sliding fork member 133 moves extensively horizontally to receive and deliver the body component, its cycle time would become even longer. Therefore, it is desirable to shorten the cycle time of the lift 126.

SUMMARY OF THE INVENTION

It is therefore an object of this invention to provide a conveying system which facilitates conveyance of a large assortment of automobile body components in an automobile assembly line. With the conveying system, a first supply path and a second supply path are connected to a main lift, are parallel to each other, and are selected according to components to be carried.

The conveying system is characterized in that a lift disposed near the second supply path has a relatively long moving distance and that a cycle time for the lift to move between its component receiving area and its destination position is relatively shortened.

According to the invention, the conveying system comprises: a first lift which is disposed near a first supply means and is operable between an area for receiving first body components of first and second types from a first supply means, a first transfer area for delivering the first body components of the first type, and a second transfer area for delivering the first body components of the second type; a first carrier for conveying the second body components from a second supply means; a first fork lift for receiving the first body components of the first type from the first lift so as to transfer the first body components onto the first carrier, the first fork lift being disposed near the first lift; a second lift for receiving the first body components of the second type from the first lift at the second transfer area, the second lift being disposed near the first lift; a second carrier for conveying the first body components of the second type from the second lift, the second carrier being disposed near the second lift; a third lift for conveying the first body components of the second type from the second carrier, the third lift being disposed above a running path of the second carrier; a second fork lift for receiving the first body and second body components from the first carrier, the second fork lift being disposed from the running path of the first carrier; and a fourth lift for receiving the first body components of the first type and the second body components from the first carrier, delivering the components to a next processing station by using the second fork lift, the fourth lift delivering by using the second fork lift the second body components from the first carrier and the first body components of the second type from the third lift to a predetermined transfer area.

The second and third lifts may respectively comprise: a cylindrical post; a frame which is vertically movable on the post; a horizontal plate supported by the frame; a sliding fork member having sliders horizontally slidable on the horizontal plate, the sliders having tables for receiving the components thereon; a horizontal driver for moving the sliding fork member horizontally; a vertical driver for moving the sliding fork member vertically; and a lift control unit for simultaneously controlling the operation of the horizontal and vertical drivers.

Furthermore, the second and third lifts may respectively comprise: a pair of posts which are vertical and parallel to each other; a pair of frames which are vertically movable on the posts; horizontal and vertical drivers for vertically and horizontally moving the frames; a horizontal plate supported by the frames; and a sliding fork member having sliders horizontally slidable on rails of the horizontal plate and having a table for receiving the components thereon.

With the foregoing arrangement, the conveying system can convey the first and second body components from the first supply path to the fourth lift, and convey only the first body components from the second supply path to the fourth lift via the third lift. Thus, the second supply path and the third lift can facilitate conveyance of the first body components.

The conveying system can handle a variety of automobile body components having different shapes and sizes, when the first supply path has access to the first carrier and the second fork lift, and when the second supply path is accessible to the second lift, the second carrier and the third lift.

When each of the second and third lifts includes a pair of posts, a counterweight can be divided. Each of divided counterweights is movable for a relatively long distance, so that the lifts can be structured to accommodate a bending moment. This can make the conveying system light in weight.

The sliding fork member of the second or third lift is controlled to be movable vertically and horizontally at the same time, which reduces a cycle time thereof, and increases the efficiency of the lift.

BRIEF DESCRIPTION OF THE DRAWINGS

FIG. 9 is an enlarged front view of the third lift in the conveying system of FIG. 1.

FIG. 10 is an enlarged side elevation of the third lift of FIG. 9.

FIG. 11 is an enlarged cross section of a sliding fork member of the third lift of FIG. 9.

FIGS. 12(a) and 12(b) show the operation of the sliding fork member of the lift of FIG. 9.

FIG. 20 is a flow chart showing the lift control routine for the lift of FIG. 17.

DETAILED DESCRIPTION OF THE PREFERRED EMBODIMENT

Figure 1:
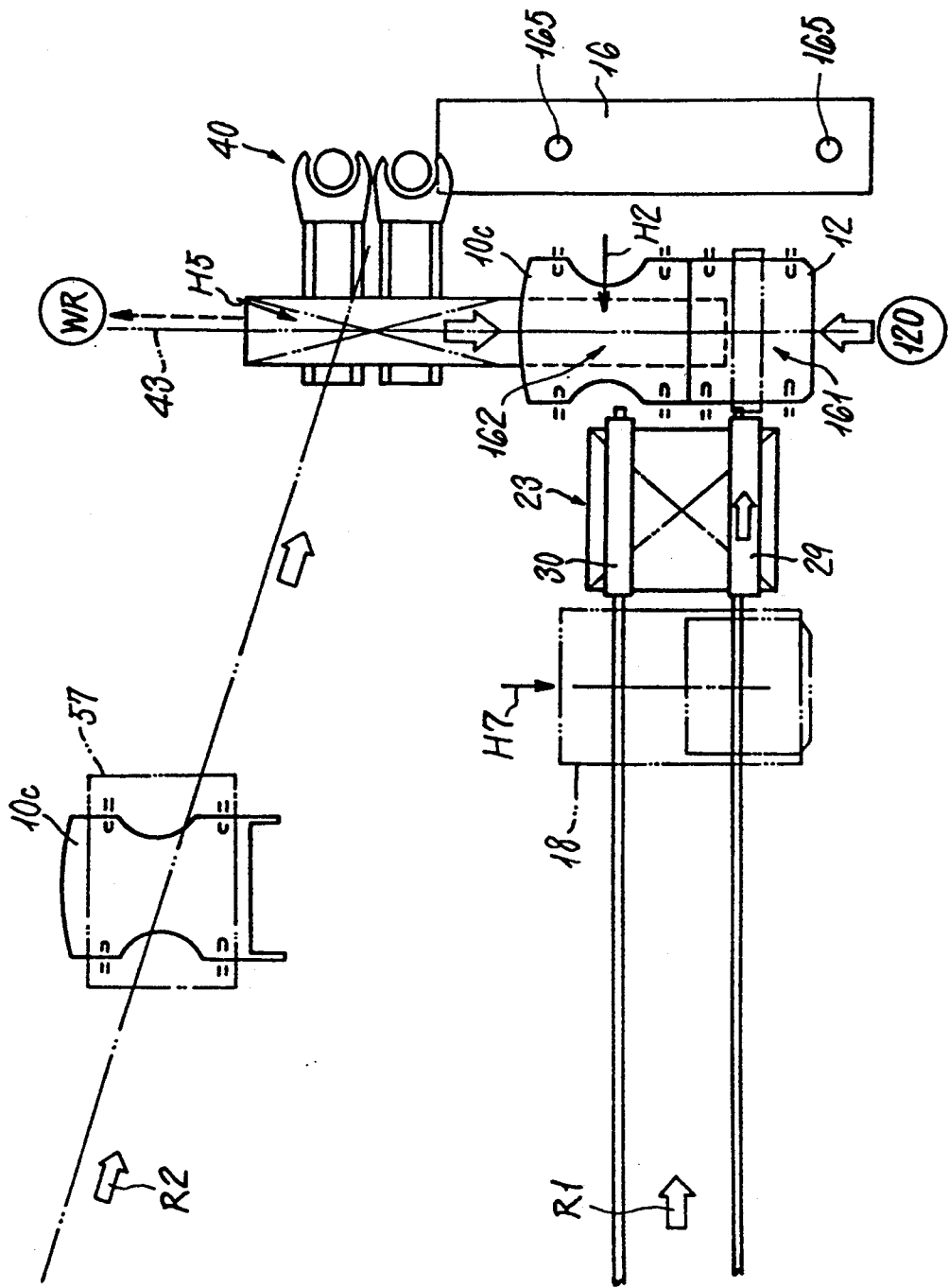
FIG. 1 is a schematic plan view of a conveying system according to an embodiment of the invention.

The conveying system of the invention will be described with reference to one embodiment shown in the drawings.

Figure 2:
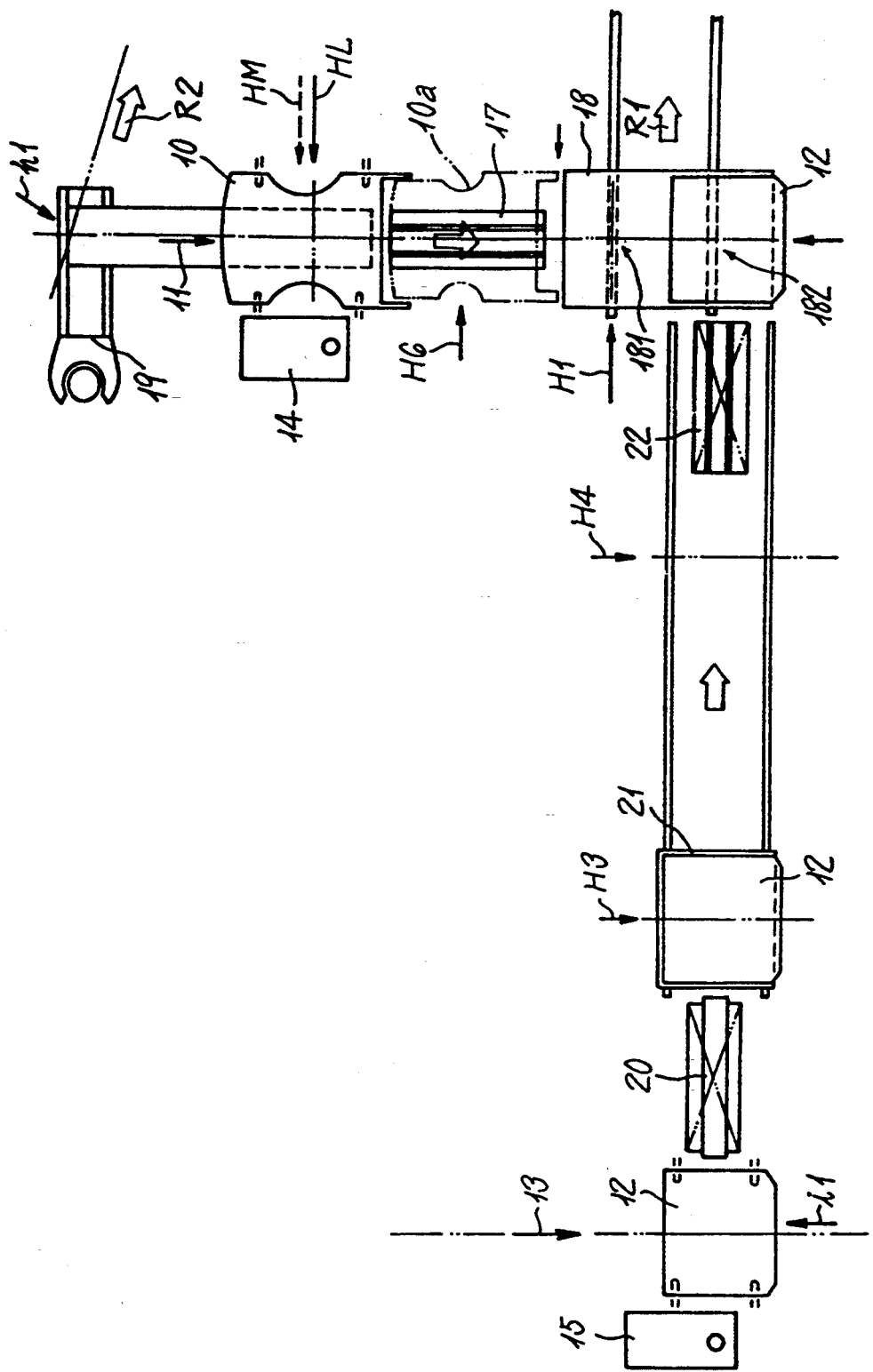
FIG. 2 is a continuation of FIG. 1.

Referring to FIGS. 1 and 2, the conveying system is located at a part of an automobile body assembly line, and includes a first route R1 and a second route R2. The second route R2 is just above the first route R1. The first route R1 is used to convey a rear floor 10a as a first body component, and a front floor 12 as a second body component. The second route R2 is only for a rear floor 10c as a special body component (to be described later). The first and second routes R1 and R2 communicate with a second transfer area H2 to be described later.

Figure 6:
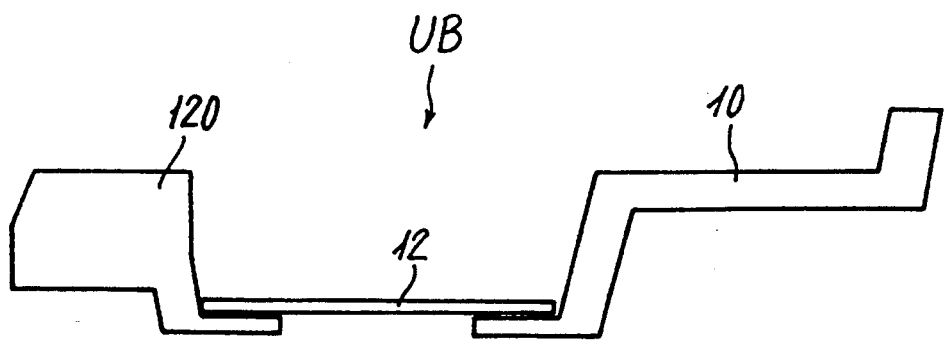
FIG. 6 is a schematic front view of under-body panels to be carried by the conveying system of FIG. 1.

One end of the first route R1 extends to a first transfer area H1, where a first carrier 18 is located. The first transfer area H1 is connected to a rear floor supply path 11 via a first fork lift 17 and a first lift 14. The rear floor supply path 11 is used to supply the rear floors 10 of the under-body UB as shown in FIG. 6. The first transfer area H1 is also connected at its other end to a front floor supply path 13 via an intermediate fork lift 22. The front floor supply path 13 constitutes a second body component supply unit. The route R1 is used to convey the rear floors 10a for regular automobiles A and B as the first body components of the first type (having substantially similar sizes and shapes). The route R2 is used to convey the rear floors 10c as the first components of the second type (having a different size and shape). The floors 10a and 10c are alternately supplied at the predetermined timing. The front floor supply path 13 is for successively supplying the front floors 12 of a single type. The components 10a and 12 are conveyed to the second transfer area H2, are transferred to the fourth lift 16 as a combined pair, and are transported to the welding section WR.

Above the rear floor supply path 11, the first lift 14 receives the rear floor 10a (or the special rear floor 10c) with a hanger (not shown), and delivers the rear floor 10a to the lower transfer area HL (or the special rear floor 10c to the intermediate transfer area HM). In other words, the first lift 14 moves selectively to the transfer area HL or HM depending upon the type of rear floor to be delivered.

At the lower transfer area HL, the rear floor 10a is received by the first fork lift 17, which carries the rear floor 10a to a rear position 181 above the first transfer area H1 of the first carrier 18. On the other hand, the special rear floor panel 10c reaches the intermediate transfer area HM, is received by a second lift 19 located at one end of the second route R2, is delivered to a position h1, and is loaded onto a second carrier 57.

Only the front floors 12 as the second body components are delivered to a front floor lift 15 via the front floor supply path 13. The lift 15 receives the front floor 12 at the lower position with a hanger (not shown), carries it upwardly, and transfers it to a fork lift 20 at a position i1. The fork lift 20 passes the front floor 12 to a carrier 21 at a transfer area H3. The carrier 21 moves toward the first carrier 18, and delivers the front floor 12 to a transfer area H4 where an intermediate fork lift 22 is located. The intermediate fork lift 22 functions to pass the front floor 12 from the transfer area H4 to a front position 182 above the first transfer area H1 of the first carrier 18.

Figure 3:
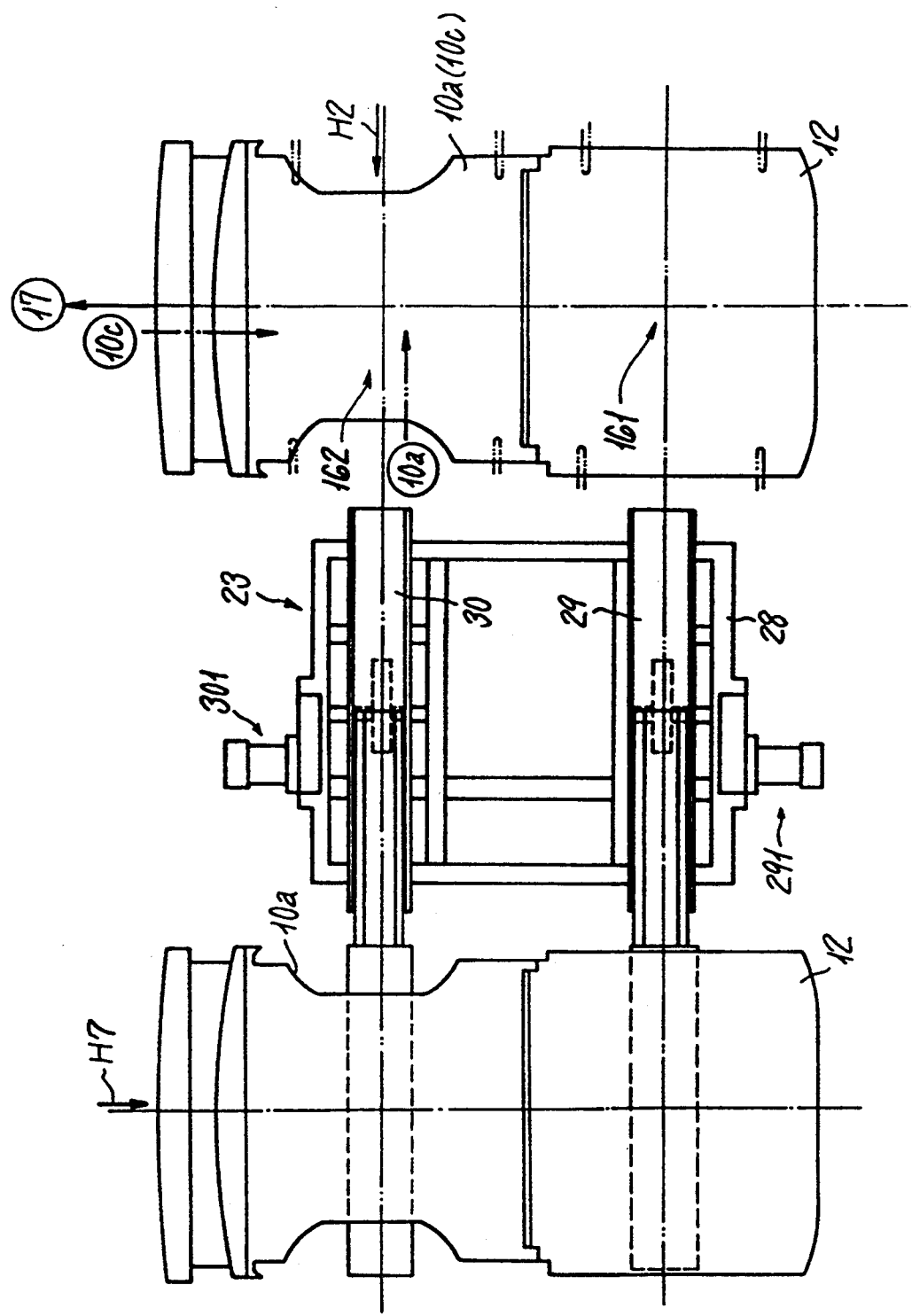
FIG. 3 is an enlarged plan view of a second fork lift of the conveying system of FIG. 1.

The first carrier 18 receives, at the front and rear positions 182 and 181, the front floor 12 and the rear floor 10a which are combined, and conveys these floors 12 and 10a along the first supply route R1 to a transfer area H7 where a second fork lift 23 is located (refer to FIG. 3).

Figure 4:
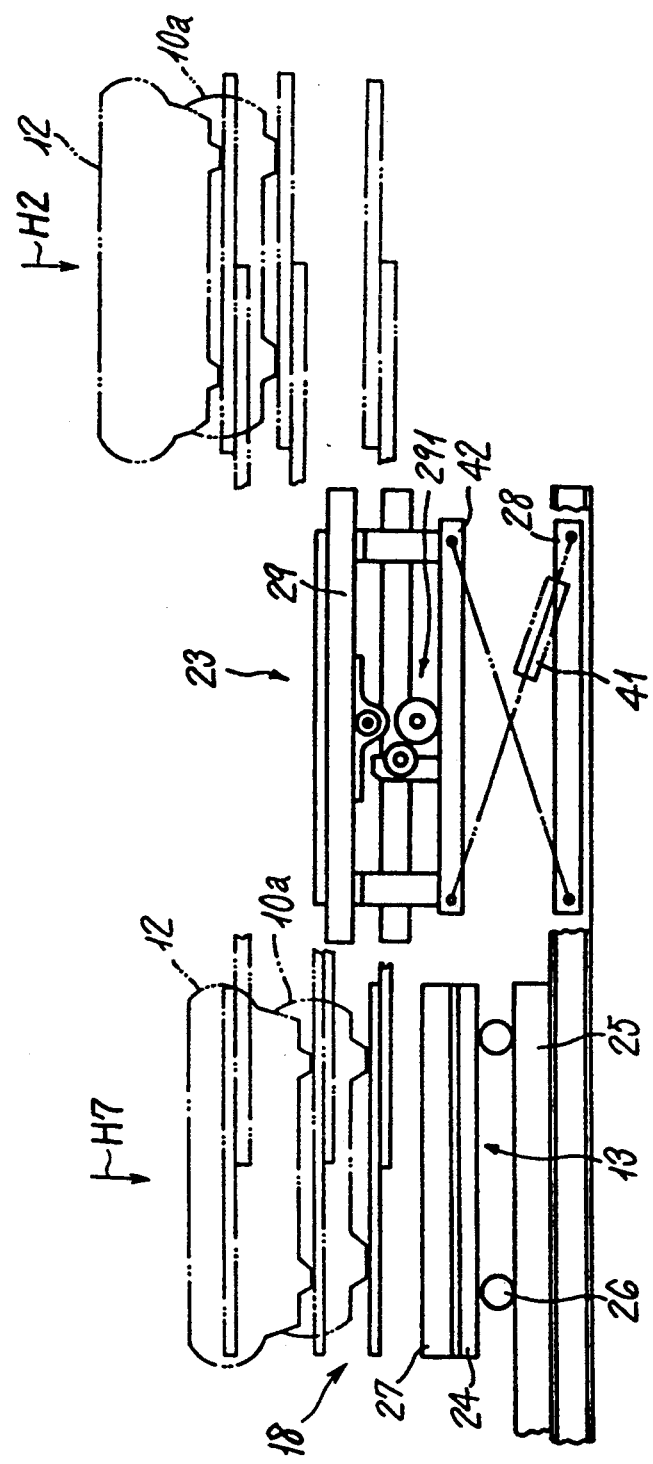
FIG. 4 is a front view of the fork lift of FIG. 3.

As shown in FIG. 4, the first carrier 18 comprises a base plate 24, wheels 26 and a stand 27. The base plate 24 is in rolling contact with rails 25 via the wheels 26. The stand 27 is designed to deliver the front floor 12 to the front position 182 which is at a relatively high level, and to deliver the rear floor 10a to the rear position 181 which is at a relatively low level (as shown in FIG. 2).

Figure 5:
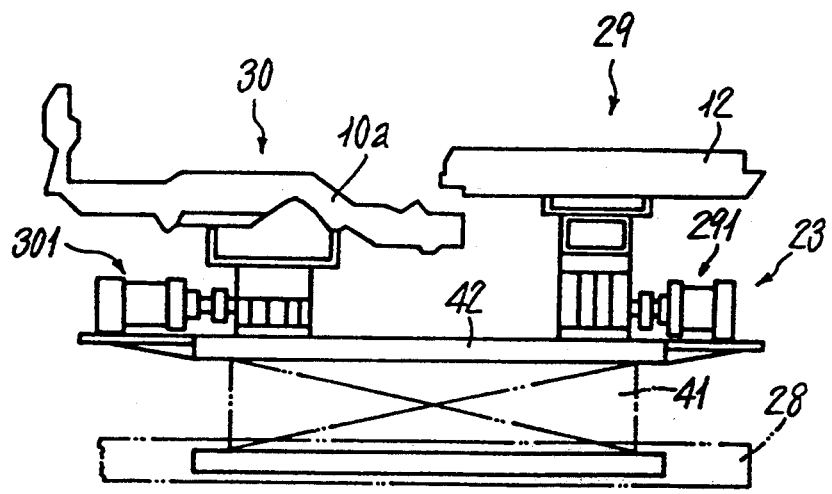
FIG. 5 is a side elevation of the fork lift of FIG. 3.

Referring to FIGS. 3, 4 and 5, the second fork lift 23 has a pair of sliding fork members 29 and 30. The sliding fork members 29 and 30 are supported on a support 28, which is fixed on the foundation of the assembly line, via a vertically movable member 42 and the lifting member 41. The second fork lift 23 receives the front and rear floors 12 and 10a at the transfer area H7, and delivers the floors 12 and 10a to set positions 161 and 162 at the second transfer area H2 of a fourth lift 16. The sliding fork members 29 and 30 include their own drivers 291 and 301, both of which are independently operated and controlled by a control unit (not shown). The sliding fork members 29 and 30 are structured similarly to a third lift 40 at the second transfer area (to be described later), and will not be described here.

Figure 7:
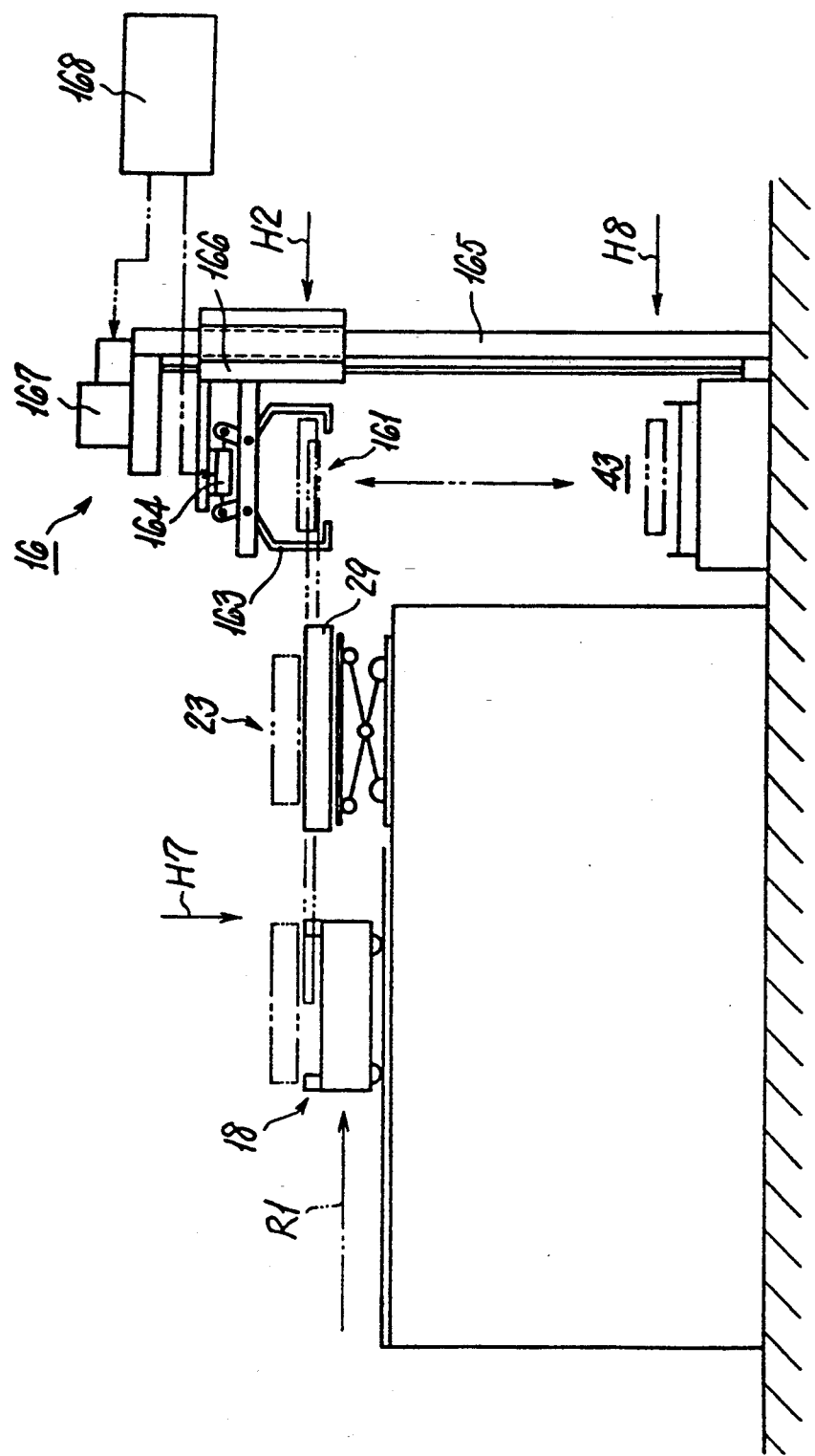
FIG. 7 is a schematic side elevation of a fourth lift and its peripheral units.

As shown in FIGS. 1 and 7, the fourth lift 16 comprises a pair of posts 165, a frame 166, a plurality of hanger arms 163 supported on the frame 166, a cylinder 164 for opening and closing the hanger arms 163, a vertical driver 167 for moving the frame 166 vertically, and a control unit 168 for controllably operating the vertical driver 167 and the cylinder 164. The control unit 168 receives from a host computer (not shown) commands concerning operation timing, operation mode and so on, thereby controlling the operation of the hanger arms 163 and the vertical movement of the frame 166. When the front and rear floors 12 and 10a (or 10c) are placed at the set positions 161 and 162 at the second transfer area H2, the lift 16 is activated to move downwardly. Then, when the lift 16 arrives at a lower transfer area H8, it is controlled to deliver the floors 12 and 10a (or 10c) to a welding route 43 extending to the welding section WR.

A front end assembly 120 is supplied to the second transfer area H2 at a predetermined timing as shown in FIG. 6, and is carried to the welding route 43 with the front and rear floors 12 and 10a (or 10c).

Figure 8:
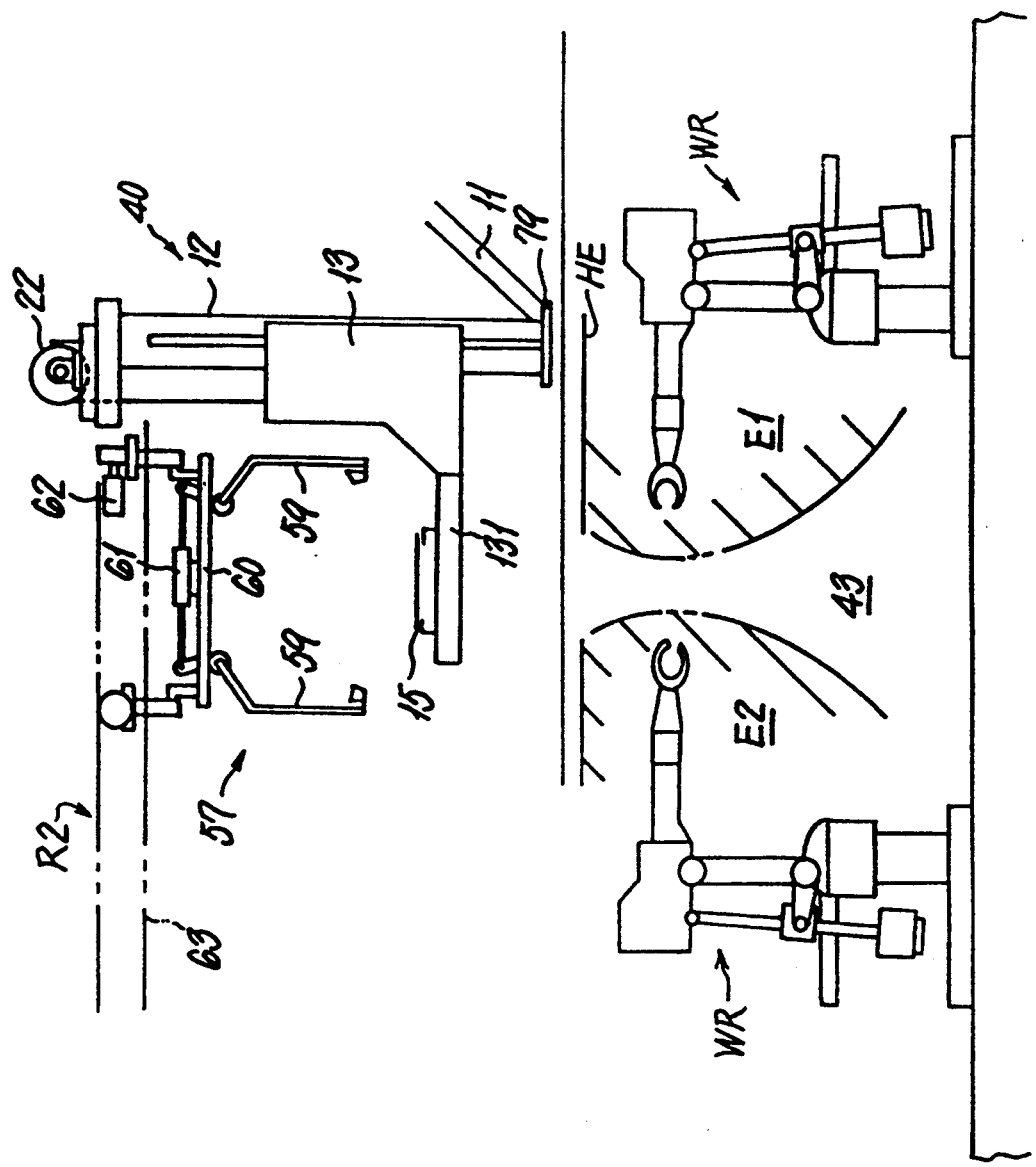
FIG. 8 is a schematic side elevation of a third lift and its peripheral units.

A second carrier 57 is disposed on the second supply route R2 connecting the second lift 19 to the third lift 40 at the second transfer area, as shown in FIGS. 1, 2 and 8. The second carrier 57 comprises a hanger frame 60 to be guided on a rail with a roller 64, a plurality of hanger arms 59 supported on the hanger frame 60, a cylinder 61 for opening and closing the hanger arms 59, and a motor 62 for driving the roller 64. At its destination H5, the second carrier 57 delivers the rear floor 10c to the third lift 40 associated with the second transfer area H2.

Referring to FIGS. 9 and 10, the third lift 40 is disposed at a relatively high level in the body assembly line, and is suspended from a lower part of a stationary frame B1. In other words, the upper end of the third lift 40 is fixed on the lower wall of the stationary frame B1, and the bottom 71 of the third lift 40 is fixed by an inclined pillar B2 extending from the stationary frame B1. The third lift 40 comprises a pair of vertical posts 72, frames 73 movably supported on the posts 72, a vertical driver 74 for vertically moving the frames 73, a sliding fork member 75 supported on the frames 73, a horizontal driver 76 for horizontally moving the sliding fork member 75, and a lift control unit 77 for operating the vertical and horizontal drivers 74 and 76.

The posts 72 are made integral at their tops and bottoms by cross beams 78 and 79, and have a pair of rails 80 on their outer walls. Each of the frames 73 is cylindrical, including a pair of rollers 21 therein. Thus, the frames 73 are supported so as to be movable on the rails 80 via the pair of rollers 21. The cross beam 79 at the bottom of the posts 72 is suspended above the welding route 43 as shown in FIG. 8. Welding robots disposed on both sides of the welding route 43 constitute the welding section WR. A predetermined space is maintained between the cross beam 79 of the posts 72 and the welding section WR so that the welding robots can work without interfering with the cross beam 79 at a highest working limit HE in their respective working areas E1 and E2 as can be seen in FIG. 8.

The vertical driver 74 comprises a pair of sprocket wheels 82 pivotally supported above the cross beam 78, a pair of chains 85 which extend around the sprocket wheels 82 and are connected with the counterweights 56 and the frames 73 at their respective opposite ends, a reduction gear 83 for rotating the sprocket wheels 82 at a predetermined speed, and a motor 84. The counterweights 56 are vertically movable within the posts.

The motor 84 is connected to the lift control unit 77 via a driving circuit (not shown). A pair of counterweights 56 are structured so as to cope with the total weight of the frames 73 and the sliding fork member 75, so that each of the counterweights 56 shares a half of the total weight. Specifically, each counterweight 56 is compact in size, i.e. relatively short, and is independently housed inside each post 72. Therefore, the counterweights 56 are movable over a relatively long distance, i.e. the lift 40 has a relatively large lifting height. Furthermore, the lift 40 can be appropriately balanced and can be reliably started and stopped at its start position and destination. Thus, the load applied to the motor can be reduced. A pair of frames 73 support the sliding fork member 75 so that it can endure the bending moment applied thereto. Therefore, it is not necessary to make the frames 73 so strong, which makes the frames light in weight.

Referring to FIG. 11, the sliding fork member 75 comprises a horizontal plate 86, and first and second sliders 89 and 90 which are slidable on the horizontal plate 86 via a plurality of rollers 65.

As shown in FIG. 11, the horizontal plate 86 has a U-shaped cross section, and is welded at its center to arms 731 of the frames 73 as can be seen in FIG. 10. Under the center of the horizontal plate 86, there is disposed a drive source bracket 34 integral with the arms 731. A motor 91 for operating the horizontal driver 76, a shaft 92 to be driven by the motor 91, and a reduction gear 93 are connected to the bracket 34. The horizontal plate 86 pivotally supports at its center a pinion gear 95 which is engaged with the reduction gear 93. The first slider 89 has a rack 96 on its under surface along its length. The pinion gear 95 is engaged with the rack 96. The motor 91 is connected to the lift control unit 77 via a driver circuit (not shown). Grooves 99 are formed on the first slider 89 along the left and right edges thereof, and are in rolling contact with rollers 65 so as to prevent the first slider 89 from being offset vertically and horizontally. A predetermined number of rollers 65 are provided on the inner surface of the horizontal plate 86 so as to sandwich the first slider 89 therebetween.

The first slider 89 has a groove 100 on its upper surface along its length. A pair of grooves 101 are formed on the left and right walls of the groove 100. The second slider 90 is slidably fitted into the groove 100. The upper surface of the second slider 90 has a table 50 for receiving the body component thereon. The rollers 65 are pivotally supported on a lower wall of the second slider 90 via horizontal pins 102 and vertical pins 103, and are in rolling contact with the grooves 101, thereby preventing the second slider 90 from being offset with respect to the first slider 29.

Referring to FIG. 12(a), a slider projecting/retracting mechanism 79 comprises a slide chain 106 and sprockets 107 and 108. An end 106a of the slide chain 106 is integral with the lower central wall of the second slider 90. The slide chain 106 is engaged with an end sprocket 107 (which is pivotally supported at one end of the first slider 89) and a center sprocket 108, and communicates with the base of the first slider 89 via the other end 106b thereof.

The mechanism 79 is horizontally movable in the direction X in response to the sliding motion of the first slider 89 in the direction X, and functions as a part of the horizontal driver. As can be seen from FIG. 12(a), a pair of the mechanisms 79 are disposed in parallel to each other, thereby allowing the second slider 90 to slide simultaneously with the first slider 89 and horizontally extend further to the left or right in the direction X compared with the first slider 89.

The lift control unit 77 mainly comprises a microcomputer, which is connected to the host computer (not shown) in the body assembly line. The lift control unit 77 functions to control the vertical and horizontal movement of the third lift 40 in response to commands concerning the vertical movement of automobile body components, types of components, drive timing, operation modes and so on.

Figure 15:
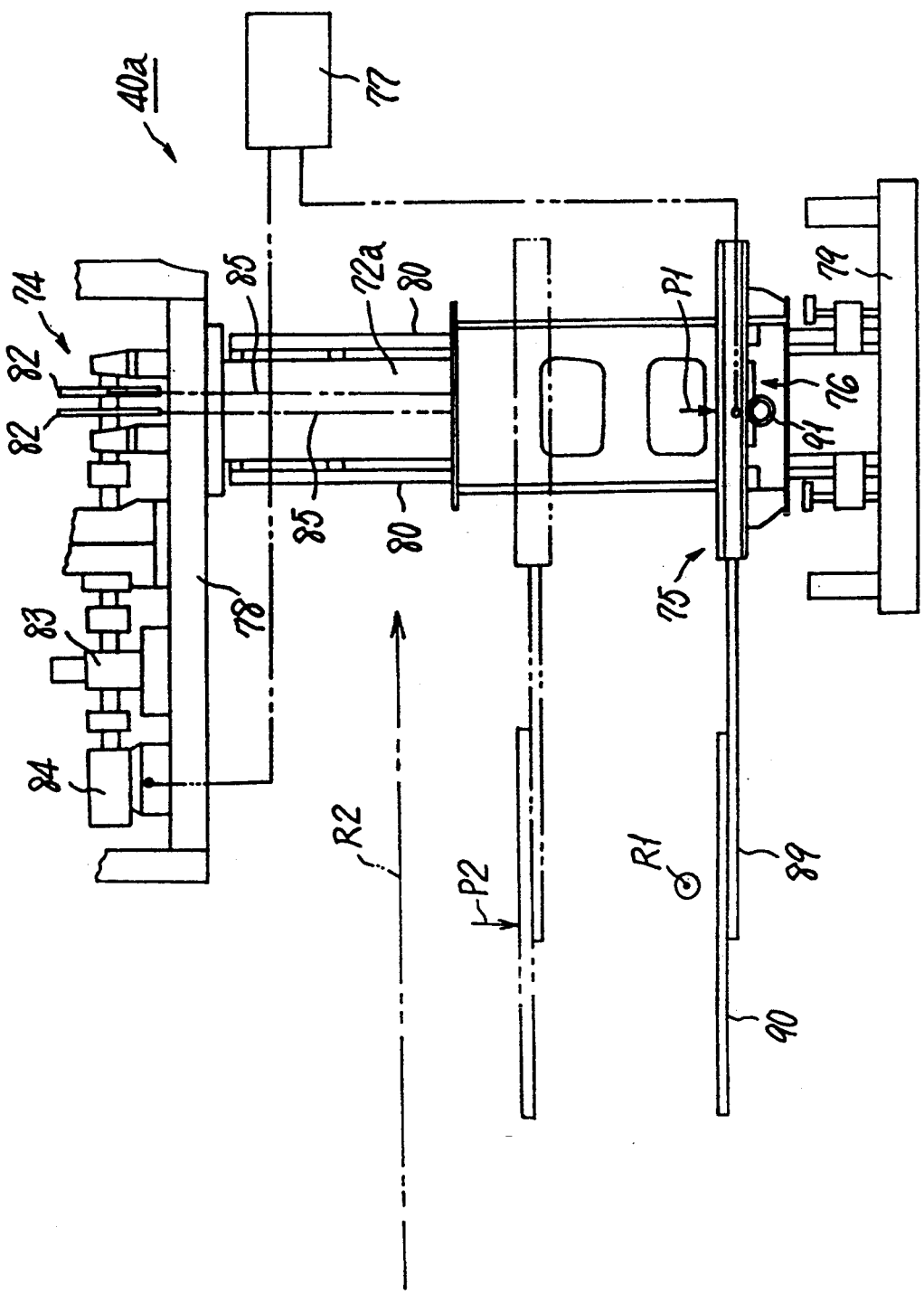
FIG. 15 is a front view of a lift to be used in place of the lift of FIG. 9.
Figure 16:
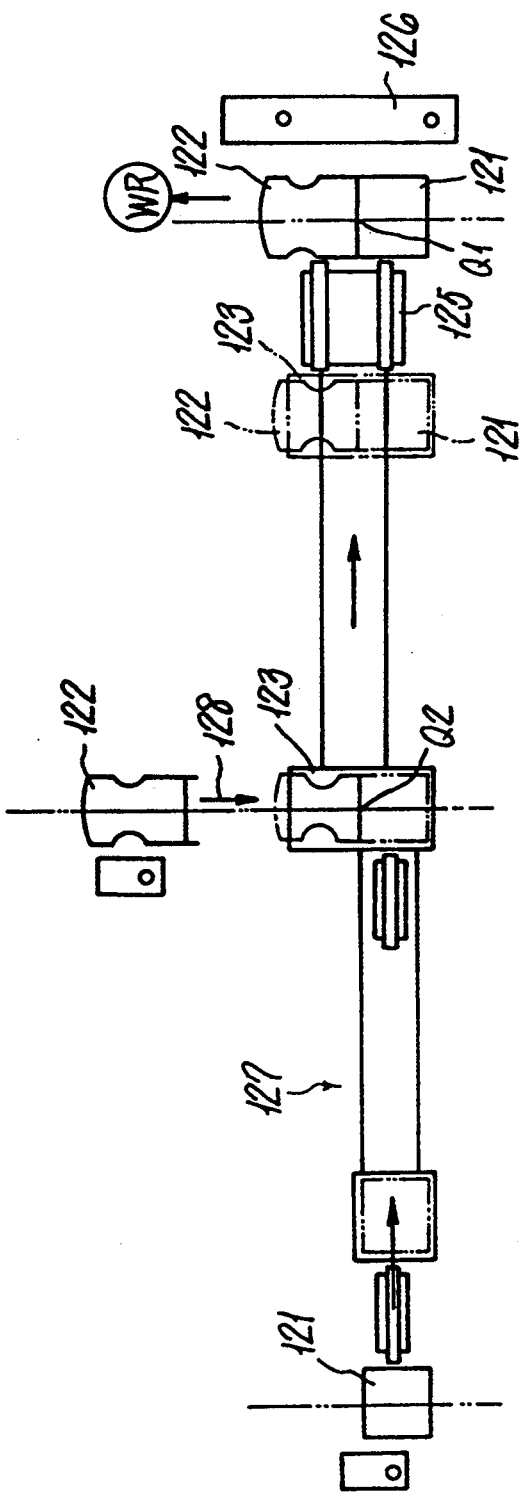
FIG. 16 is a schematic plan view of a conventional conveying system.
Figure 17:
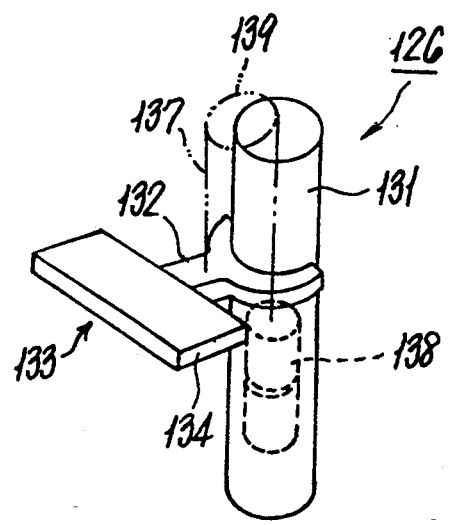
FIG. 17 is a schematic perspective view of a fork lift of the conventional conveying system.
Figure 18:
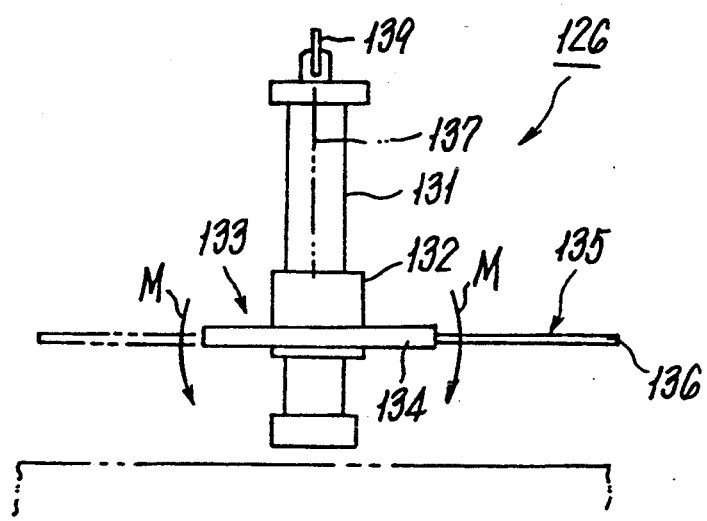
FIG. 18 is a schematic front view of the lift of the conventional conveying system.
Figure 19A:
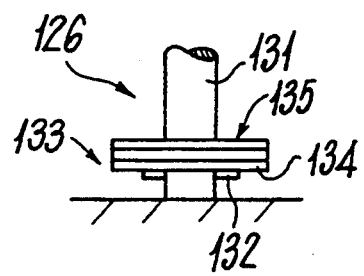
FIGS. 19(a), 19(b) and 19(c) show the operation of the lift of the conventional conveying system.
Figure 19B:
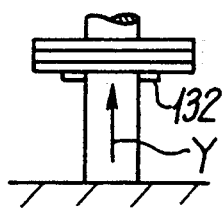
Figure 19C:
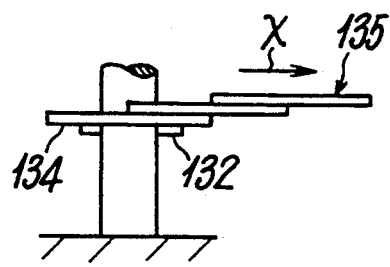

In the foregoing description, the third lift 40 includes a pair of posts 72. When the component to be carried is relatively light in weight, the third lift 40 may be replaced with a lift 40a including a single post 72a as an alternative arrangement, as shown in FIG. 15. The lift 40a comprises a post 72a, a counterweight 56a, a cable 85a and so on. Thus, the third lift 40a is compact and less expensive. The arrangement and structure of the other parts of the lift 40a are the same as those of the third lift 40 shown in FIGS. 10 and 11. Like or corresponding parts are denoted by like or corresponding reference numerals. Therefore, the description of the lift 40a will be omitted here.

The conveying system shown in FIGS. 1 to 12 is controlled by the host computer of the automobile assembly line, the lift control unit 77, and the control units for the carriers related to the first and second supply routes R1 and R2.

As shown in FIGS. 1 to 12, the conveying system includes the first supply route R1 for delivering the rear floor 10a or 10c from the supply path 11 and the front floor 12 from the supply path 13 to the second transfer area H2 via the first transfer area H1, and the second supply route R2 for selectively conveying only the rear floor 10c from the supply path 11 to the second transfer area H2.

The conveying system selectively operates in a first conveying mode or a second conveying mode. In the first conveying mode, the conveying system conveys the rear floor 10a and the front floor 12 to the second transfer area H2 via the first transfer area H1 and the first supply route R1. At the transfer area H2, the front and rear floors are placed on the set positions 161 and 162. In the second conveying mode, the conveying system conveys to the second transfer area H2 the rear floor 10c via the second supply route R2 and the front floor 12 via the first supply route R1. At the transfer area H2, the front and rear floors are placed on the set positions 161 and 162, respectively.

In operation, the host computer checks whether or not the conveying system is normal. When the conveying system is normal, the host computer selects a predetermined program for either the first or second conveying mode, thereby controlling the conveying system.

In response to the command from the host computer, the carrier 21 sequentially provides the front floors 12 to the first carrier 18 at the preset timing. On receiving the rear floor 10a via the rear floor supply path 11, the first lift 14 moves upwardly to carry the rear floor 10a to the lower transfer area HL. On the other hand, when receiving the rear floor 10c, the first lift 14 ascends to carry it to the intermediate transfer area HM.

The fork lift 17 places the rear floor 10a at the rear position 181 above the first transfer area HI of the first carrier 18, when the conveyor system is in the first conveying mode and receives a command to assemble A and B type automobiles from the host computer. On the other hand, when the conveyor system is in the second conveying mode and receives a command to assemble a C type automobile from the host computer, the rear floor 10a is held at the standby position H6.

The second lift 19 remains on standby while the conveying system receives the command for the A and B type automobiles. Arrival of the command for the C type automobile allows the second lift 19 to move upwardly to the intermediate transfer area HM. When the first lift 14 delivers the rear floor 10c to the intermediate transfer area HM, the second lift 19 receives it and conveys it to the position h1. Detecting the arrival of the rear floor 10c at the position h1, the second carrier 57 closes its hanger, runs on the second supply route R2, and delivers the rear floor 10c to the destination H5 above the third lift 40 at the second transfer area H2. Then, the second carrier 57 returns to the position h1.

In response to the command for the A and B type automobiles from the host computer, the first carrier 18 detects the arrival of the front and rear floors 12 and 10a at the front and rear positions 182 and 181, and delivers the front and rear floors to the transfer area H7 via the first supply route R1. On the other hand, in response to the command for the C type automobile, the first carrier 18 detects the arrival of only the front floor 12 at the front position 182, and delivers the front floor 12 to the transfer area H7 via the first supply route R1. In either case, the first carrier 18 then returns to the first transfer area H1 in response to a command from the host computer.

During the command for the A and B type automobiles, the second fork lift 23 operates the sliding fork members 29 and 30 in response to a stop signal for the first carrier 18, receives the combined front and rear floors 12 and 10a at the transfer area H4, and delivers them to the set position 161 of the fourth lift 16. On the other hand, under the command for the C type automobile, the second fork lift 23 operates only the sliding fork member 29 to receive the front floor 12 at the transfer area H7, and delivers it to the set position 161 of the fourth lift 16.

Figure 14:
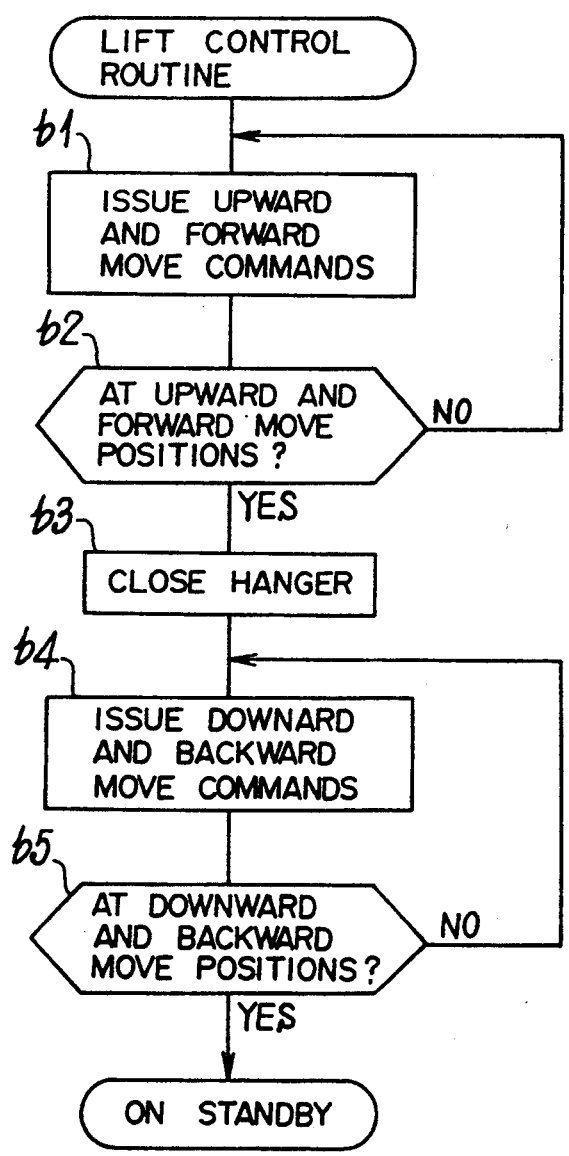
FIG. 14 is a flow chart of the lift control routine for the third lift of FIG. 9.

The lift control unit 77 controls the operation of the fourth lift 16 according to the program shown in FIG. 14.

Figure 13A:
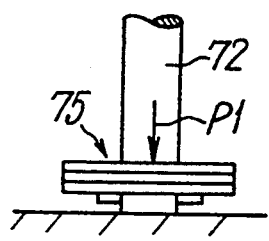
FIGS. 13(a), 13(b) and 13(c) show the operation of the lift of FIG. 9.
Figure 13B:
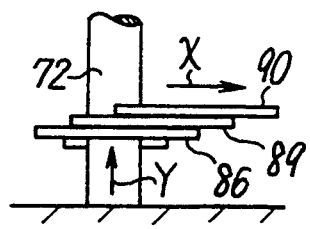
Figure 13C:
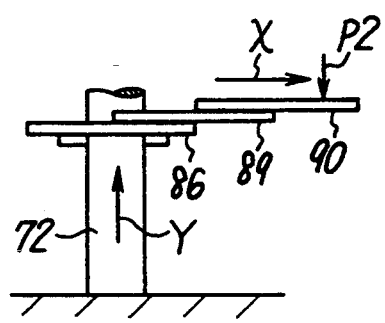

In the main routine (not shown), the lift control unit 77 detects the arrival of the rear floor 10c at the lower position P1 (i.e. the destination H5 above the lift 40) via the second supply route R2, and advances to step b1 shown in FIG. 14. In step b1, the lift control unit 77 confirms that the rear floor 10c is placed on the table 50 of the third lift 40, simultaneously issuing both the ascending command and advancing command (i.e. to move laterally to the right as shown in FIG. 13) to the vertical and horizontal drivers 74 and 76, respectively.

In response to the foregoing commands, not only are the motors 84 and 91 operated to vertically and horizontally move the sliding fork member 75 but the slider projecting/retracting mechanisms 79 are also operated. Thereafter, the first and second sliders 89 and 90 move in the directions X and Y as shown in FIG. 13(b), waiting for the arrival of the table 50 of the third lift 40 at the upper position P2 from the lower position P1 (i.e. the set position 162 above the second transfer area H2 shown in FIG. 1). In response to the sliding motion of the first slider 89, the second slider 90 automatically extends to the left or right in the direction X.

When a position sensor (not shown) detects the arrival of the second slider 90 at the upper position P2, the lift control unit 77 goes to step b3, where it issues a command to close the hanger of the fourth lift 16 so that the hanger receives the rear floor 10c at the upper position P2 (i.e. the set position 162).

Thereafter, the lift control unit 77 advances to step b4, where it issues a command to descend and retract the sliding fork member 75 in response to the hanger closing signal. The lift control unit 77 waits until the sliding fork member 75 reaches the descending and retracting position, and puts the sliding fork member 75 on standby after it returns to the original position shown in FIG. 13(a).

As described so far, the third lift 40 (FIG. 9) moves both vertically and horizontally at the same time between the lower position P1 and the upper position P2, thereby reducing its vertical stroke and cycle time.

In addition, the second lift 19 (FIG. 2) may be reliably and effectively controlled by the foregoing program in the similar manner as mentioned with respect to the third lift 40.

The fourth lift 16 is disposed above the set positions 161 and 162 (for the first and second components) above the second transfer area H2. When the host computer is in the first conveying mode and issues the command for the A and B type automobiles, the fourth lift 16 waits until the front and rear floors 12 and 10a are placed on the set positions 161 and 62. Then, the fourth lift 16 receives the floors 12 and 10a which are combined, delivering them to the welding route 43 via the transfer area H7. Then, the fourth lift 16 moves upwardly, and is on standby.

On the other hand, when the host computer is in the second conveying mode and issues the command for the C type automobile, the rear floor 10c from the third lift 40 and the front floor 12 from the second fork lift 23 are delivered in this order to the set positions 161 and 162, respectively, at the second transfer area H2. The controller (not shown) for the fourth lift 16 issues a signal for stopping the second sliding fork member 29 of the second fork lift 23 until the rear floor 10c is reliably placed on the set position 162. Then, after confirming the arrival of the front and rear floors, the fourth lift 16 moves downwardly, delivering the combined front and rear floors 12 and 10a at the transfer area H7 communicating with the welding route 43. Then, the fourth lift 16 ascends, being on standby.

When the conveying system is operating in the first conveying mode to assemble the A and B type automobiles, the second fork lift 23 simultaneously delivers the front and rear floors 12 and 10a to the set positions 161 and 162 of the fourth lift 16. In the second conveying mode to assemble the C type automobile, the rear floor 10c is delivered to the second transfer area H2 by the third lift 40 while the front floor 12 is delivered to the area H2 by the second fork lift 23. In other words, the rear floors 10a and 10c are delivered via different routes. Therefore, it is possible to assemble the front floors of one type with the rear floors which are rather large and have different shapes. This means that a variety of rear floors can be assembled. By simply adding the second lift 19, the second carrier 57, and the third lift 40, advantageous formation of the conveying system without discarding existing facilities is made possible.

Advantages and Industrial Applicability

The conveying system of the invention will be advantageously incorporated in an automobile body assembly line. Especially, the conveying system can be easily applied to an existing conveying system which has only a first supply path, through addition of a second supply path. The two supply paths will be selectively used to process a large assortment of automobile components easily and at a reduced cost.

What is claimed is:

1. A conveying system for conveying in a combined manner a plurality of types of first body components having different shapes from a first supply means and one type of second body component from a second supply means, comprising:

a first lift which is disposed near the first supply means and is operable between a component receiving area for receiving the first body component from the first supply means, a first transfer area for delivering the first body component of a first type and a second transfer area for delivering the first body component of a second type;

a first carrier for conveying the second body component from the second supply means;

a first fork lift which receives the first body component of the first type from the first lift at the first transfer area and transfers the first body component onto the first carrier, and is disposed near the first lift;

a second lift for receiving the first body component of the second type from the first lift at the second transfer area, the second lift being disposed near the first lift;

a second carrier for conveying the first body component of the second type from the second lift, the second carrier being disposed near the second lift;

a third lift for conveying the first body component of the second type from the second carrier, the third lift being disposed above a running path of the second carrier;

a second fork lift for receiving the first and second components from the first carrier, the second fork lift being disposed from the running path of the first carrier; and a fourth lift for receiving the first body component of the first type and the second body component form the first carrier, delivering the components to the next processing station from the second fork lift, the fourth lift delivering, by using the second fork lift, the second component from the first carrier lift and the first component of the second type from the third lift to a predetermined destination.

2. The conveying system of claim 1, wherein the first lift comprises means for receiving and vertically conveying the first component, the receiving and conveying means being movable between the component receiving area and the first or second transfer area below the component receiving area, and being selectively stopped at the component receiving area, the first transfer area, or the second transfer area.

3. The conveying system of claim 1, wherein the fourth lift includes a member which is vertically movable between an area for receiving the first and second components and a lower area for delivering the components to a next processing station.

4. The conveying system of claim 1, wherein the second lift comprises a sliding fork member carrying the component of the second type and conveys the sliding fork member from the second transfer area to the second carrier, and wherein the third lift comprises:

a cylindrical and vertical post having rails on the outer surface thereof; a frame which is vertically movable on rails of the vertical post; a horizontal plate supported by the frame; a sliding fork member having sliders horizontally slidable on a plurality of rails of the horizontal plate, the sliders having a table for receiving the components thereon; a vertical driver for moving the sliding fork members vertically; a horizontal driver for moving the sliding fork members horizontally; and a lift control unit for simultaneously controlling the operation of the horizontal and vertical drivers in such a manner that the third lift conveys the component of the second type from the second carrier to the second transfer area.

5. The conveying system of claim 1, wherein at least one of the second and third lifts comprises: a pair of posts which are vertical with respect to a foundation of the assembly line and are parallel to each other; a pair of frames being vertically movable on the pair of the posts; a vertical driver for vertically moving the frames at the same time; and a sliding fork member having a horizontal plate supported on the frames, and sliders horizontally slidable on rails of the horizontal plate and having a table for receiving the components thereon.

* * * * *